Patented July 8, 1930

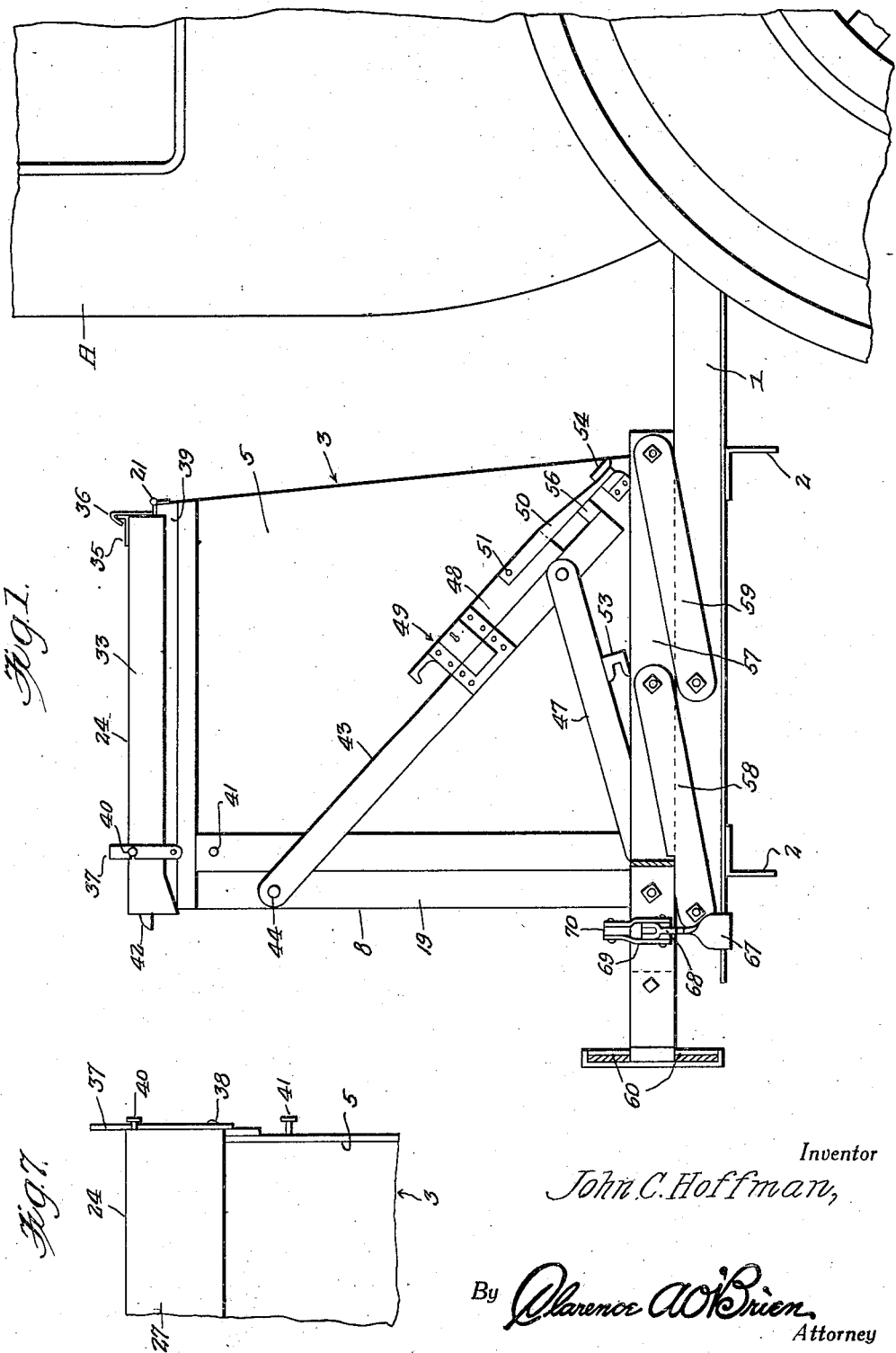

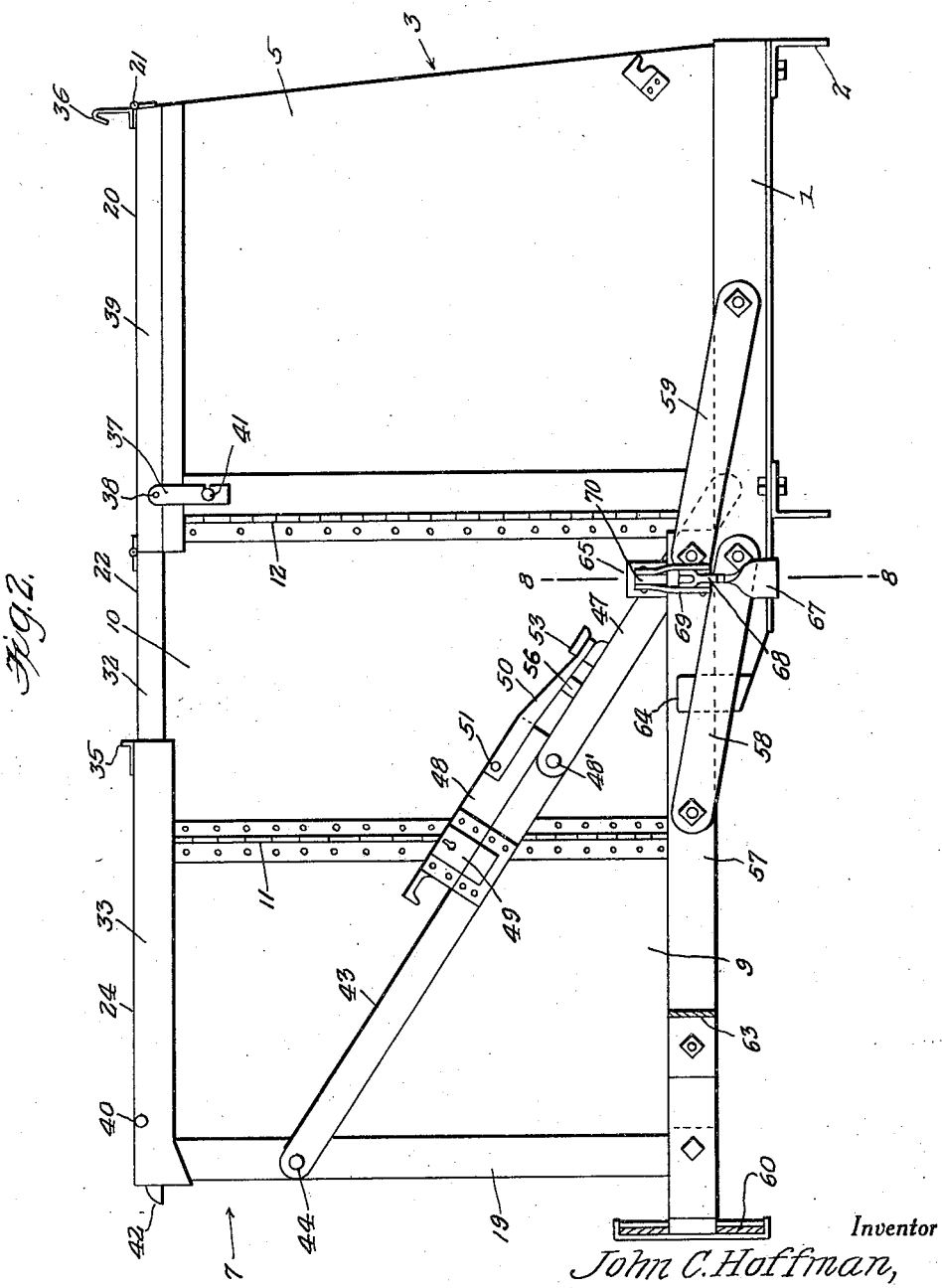

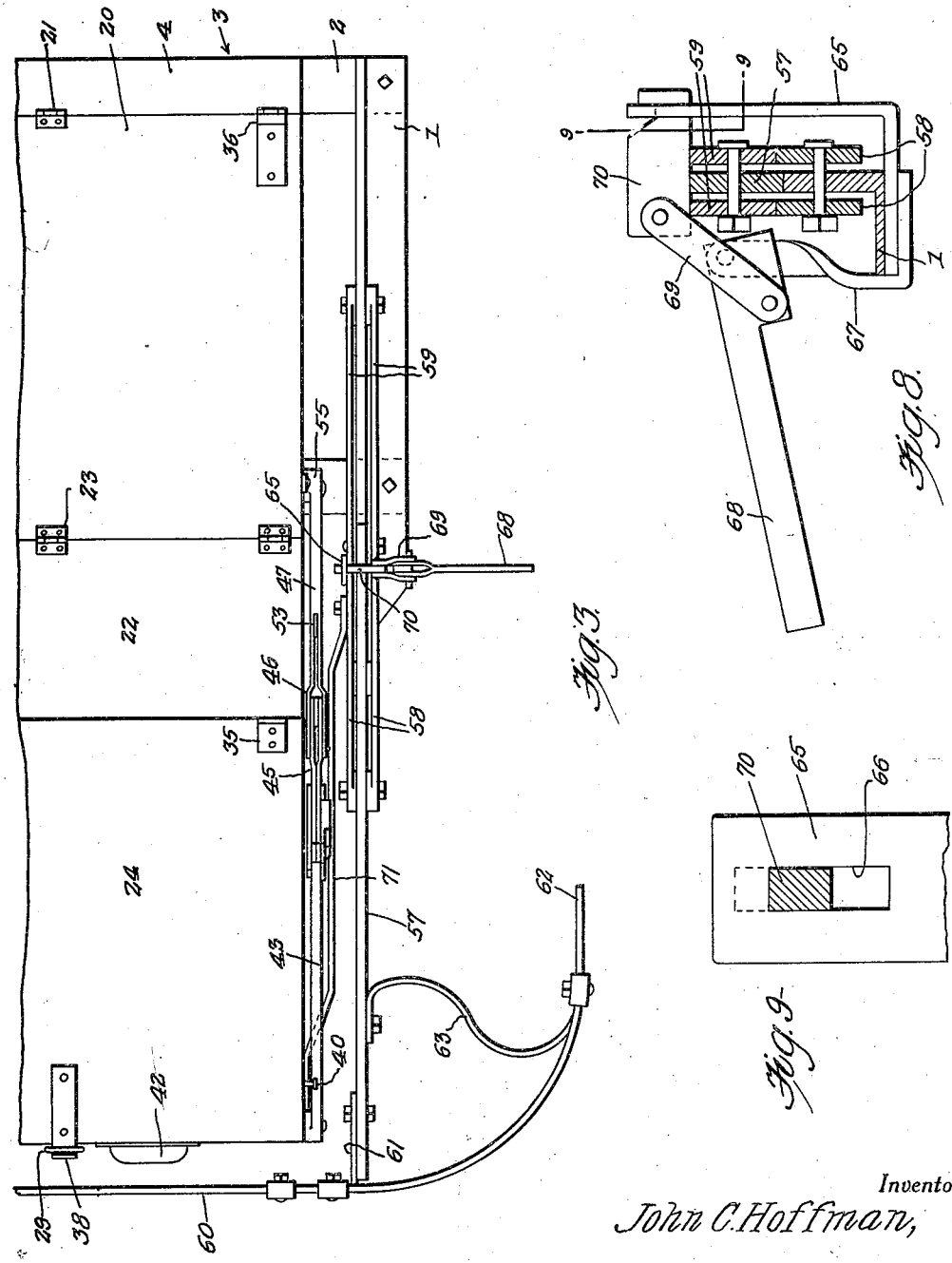

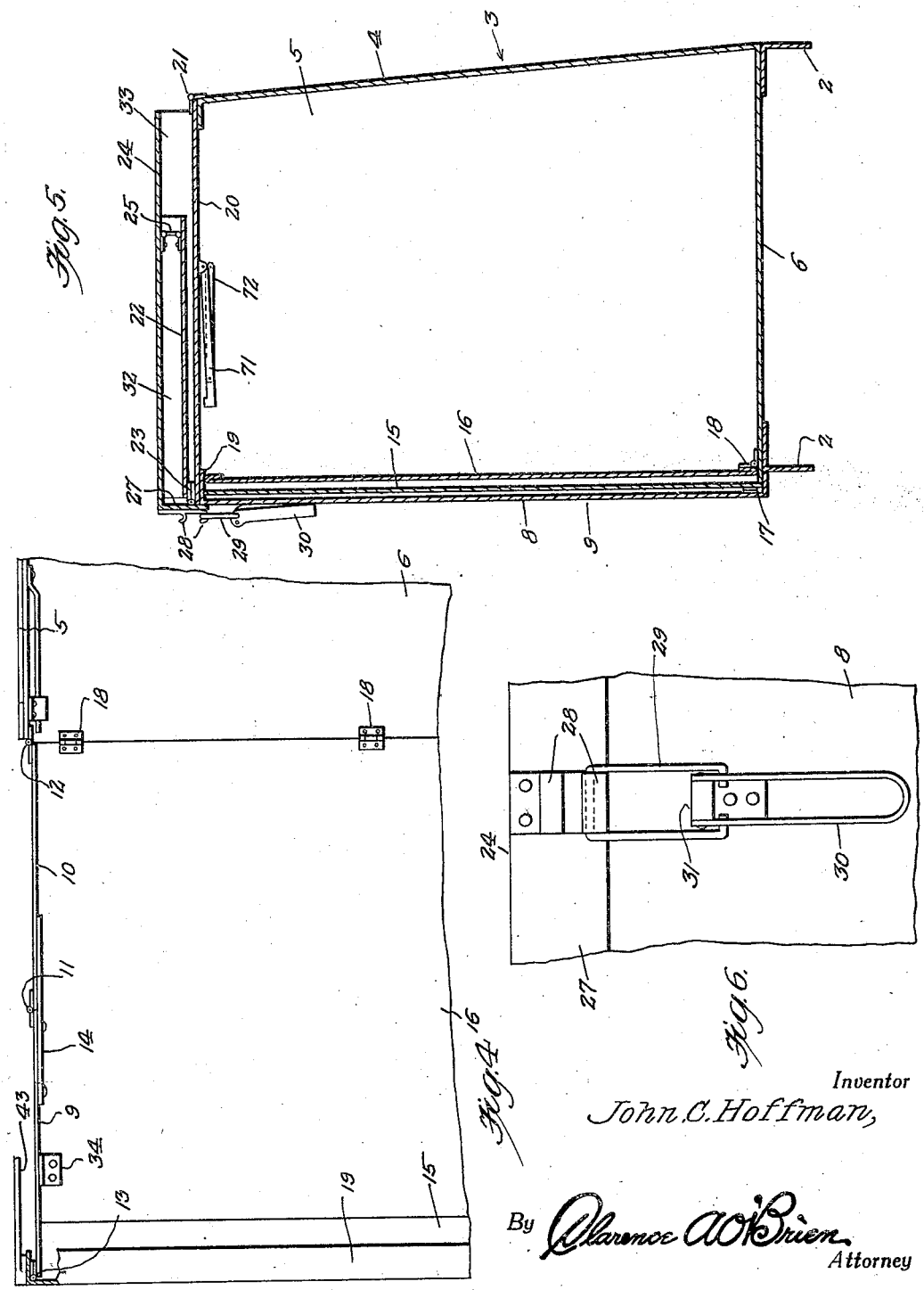

1,770,309

UNITED STATES PATENT OFFICE

JOHN C. HOFFMAN, OF SIOUX CITY, IOWA

AUTOMOBILE TRUNK

Application filed January 10, 1930. Serial No. 419,890.

This invention relates to improvements in trunks and more particularly to devices of this character which are adapted to be mounted on the rear ends of an automobile or other vehicle for the storage of baggage or other articles.

An important object of the invention is to provide, in a manner as hereinafter set forth, an automobile trunk of the aforementioned character of a construction and arrangement which embodies means whereby said trunk may be extended in a manner to greatly increase the capacity thereof when it is so desired and which further includes means whereby the same may be securely locked in either extended or closed position.

Another important object of the invention is to provide, in a manner as hereinafter set forth, a trunk of the aforementioned character which includes a rearwardly disposed pumper which is mounted on the trunk supporting structure in such a manner that said bumper will be shifted rearwardly simultaneously with the opening of the trunk whereby said trunk will be at all times protected from rear end collision by other vehicles.

A further important object of the invention resides in the provision of a trunk of the aforementioned character having a stationary main body portion having a rearwardly shiftable rear wall which is hingedly connected to said main section through the medium of horizontally swinging sectional end walls.

A still further object of the invention resides in the provision of a pair of bottom plates adapted to extend in overlapping relation to each other when the trunk is in extended position in a manner to form a bottom for the extended portion of said trunk, said bottom plate being mounted for swinging movement in a vertical plane, one on the rear portion of the bottom of the stationary main section and the other on the bottom of the rearwardly shiftable wall.

A still further object of the invention resides in the provision of a sectional extensible hinged cover adapted to completely close the trunk either in extended or closed position.

Still further objects of the invention are to provide a trunk of the aforementioned character which will be attractive in appearance, strong, durable, efficient in its use and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in side elevation of an automobile trunk constructed in accordance with this invention with the rear bumper mounted in position thereon, said trunk being shown in closed or unextended position and the pumper being shown in cross section.

Figure 2 is a view in side elevation of the invention showing the trunk in extended position.

Figure 3 is a top plan view showing one end of the invention, the same being shown in extended position.

Figure 4 is a fragmentary view in top plan partly broken away in section of a portion of the trunk in extended position with the cover removed.

Figure 5 is a vertical sectional view of the trunk in unextended or closed position.

Figure 6 is a detail view showing one of the latching devices for securing the cover in closed position to the shiftable rear wall.

Figure 7 is a fragmentary view in rear elevation illustrating an upper corner portion of the trunk in closed position as seen in Figure 1.

Figure 8 is a sectional view taken substantially on the line 8—8 of Figure 2.

Figure 9 is a detail view in section taken substantially on the line 9—9 of Figure 8.

Referring to the drawings in detail, the reference character A designates the rear end portion of an automobile to the chassis of which is secured in any suitable manner the rearwardly projecting spaced parallel angle iron bars 1—1 having their vertical portions disposed on their inner sides. Longitudinally spaced transverse cross bars 2—2 of angle iron extend between the projecting portions of the bars 1—1 for strengthening the same.

The longitudinal bars 1—1 and transverse bars 2—2 constitute a supporting frame upon which is mounted a fixed or stationary main trunk section which is designated generally by the reference character 3 and which includes a front wall 4, end walls 5—5 and a bottom 6.

Mounted on the rear of the stationary main section 3 is a movable section designated generally by the reference numeral 7 (see Figure 2) and said movable section comprises a horizontally shiftable vertical wall 8 to the opposite ends of which are hingedly secured the end wall sections 9—9 which are adapted to swing inwardly in a horizontal plane against the inner side of the shiftable wall 8. Co-acting end wall sections 10—10 are hingedly secured, as at 11—11 to the forward vertical edges of the wall sections 9—9 and said end wall sections 10—10 have their forward vertical edges hingedly secured, as at 12—12 to the rear vertical edges of the end walls 5—5 of the stationary main trunk section 3. As illustrated to advantage in Figure 4 of the drawings the hinge connection between the end wall sections 9—9 and the shiftable wall 8 is designated by the reference numeral 13. The hinges 11, 12 and 13, are arranged to permit the end wall sections 9—9 and 10—10 to swing inwardly in a horizontal plane. Rigid bars 14—14 are fixed to the end wall sections 9—9 and extend partly over the end wall section 10—10 in a manner to limit the outward swinging movement of the sections 9—9 and 10—10 on the hinge 11.

As best illustrated in Figures 4 and 5 of the drawings, the movable section 7 further includes a pair of vertically swingable bottom plates or walls 15 and 16, the former having its bottom edge hingedly secured, as at 17, to the lower inner side of the shiftable wall 8 and the bottom plate or wall 16 having its lower edge hingedly connected, as at 18, to the inner side of the bottom 6 of the main stationary trunk section 3 adjacent the rear edge thereof. When the shiftable wall 8 is in its rearmost position, the plate or wall 15 is adapted to be swung downwardly and forwardly to a horizontal position on the hinge 17 and the wall or plate 16 is to be swung rearwardly and downwardly to a horizontal position in overlapping relation to the bottom wall 15 on its hinge 18, as illustrated to advantage in Figure 4. Suitable lugs (not shown) may be provided on the inner side of the end wall sections 9—9 and 10—10 at the bottom edges thereof upon which the bottom wall or plate 15 may rest for maintaining the same in a horizontal position when the shiftable or movable section 7 is extended. The marginal edges of the shiftable wall 8 are provided with right angularly disposed forwardly extending flanges 19, the lowermost of which is adapted to extend under the rear end portion of the bottom wall 6 of the main section 3 in the manner illustrated in Figure 5 of the drawings. When in folded position, the bottom wall 15 is disposed within the flanges 19 in opposed relation to the shiftable wall 8 and the bottom wall or plate 16 is disposed within the rear portion of the main stationary section 3. As seen in Figure 5, the uppermost portion of the flange 19 of the shiftable wall projects forwardly over the upper edge of the bottom wall or plate 16 when the trunk is in unextended position.

A cover section 20 is hingedly mounted, as at 21, on the upper end of the front wall of the stationary main section 3 and extends forwardly thereover and is adapted to rest on the flange 19 of the shiftable wall 8 when the trunk is in unextended or closed position. An intermediate cover section 22 has one edge hingedly connected, as at 23 to the free end portion of the cover section 20 and, as illustrated in Figure 5, is adapted to extend forwardly thereover when the trunk is in unextended position. An end cover section 24 is connected to the end portion of the intermediate cover section 22 through the medium of a double hinge 25 which is secured to said end cover section 24 at a point intermediate the forward and rear edges thereof. The end cover section 24 is provided with the depending flanges 26 on its opposite ends which extend over the corresponding ends of the cover sections 22 and 20 and overlap the end walls 5 of the main stationary front section 3 and the rear edge of the end cover section 24 is provided with a depending flange 27 which extends over the adjacent edges of the said cover sections 22 and 20 and the upper portion of the shiftable wall 8 when the trunk is in unextended position.

As illustrated to advantage in Figures 5 and 6 of the drawings, a latching device is provided for securing the cover in closed position on the trunk either in extended or unextended position and said latching device comprises a pair of integrally connected hooks 28 mounted on the depending flange 27 of the end cover section 24 which hooks are adapted to be selectively engaged by a loop 29 operatively connected and supported on a lever 30 which is pivotally mounted as at 31 on the rear side of the shiftable wall 8. The lever 30 is swung upwardly in a manner to permit the loop 29 to be engaged over one of the hooks 28 and said lever is then swung downwardly in a manner to draw the loop 29 downwardly and engage the cover section tightly in place, said lever being adapted to swing past its dead center in order to maintain the same in locked position, as will be understood. When the trunk is in unextended position, the loop 29 is to be engaged with the lowermost hook 28 as illustrated in Figure 5 and when the trunk is in extended position, the loop 29 is to be engaged with the uppermost hook 28. As illustrated to best advantage in Figure 2 of the drawings, the end cover section 24 extends forwardly in overlapping relation to the intermediate cover section 22 when the trunk is in extended position and it will be further seen that the cover sections 24 and 22 are provided with depending end flanges 32—32 and 33—33 respectively which extend over the outer side of the end wall sections 9—9 and 10—10 in a manner to form a weather proof joint between the cover section and said walls and also to support said walls laterally and prevent the same from being forced outwardly when the trunk is in extended position and filled. It may be well to here mention that the bottom wall or plate 16 of the movable section 7 is provided, adjacent its free edge and on its opposite end with upstanding lugs or ears 34 (see Figure 4) for engagement with the inner side of the end wall sections 9—9 to prevent said wall sections 9—9 and the wall sections 10—10 from swinging inwardly when the trunk is in extended position. An upstanding lug 35 is fixed on the upper side of the end cover section 24 at the forward edge thereof for engagement with a resilient latch hook 36 which is mounted on the upper side of the cover section 20 adjacent the hinged edge thereof to prevent upward movement of the end cover section 24 when the trunk is in unextended position, as illustrated in Figure 1. Latch hooks 37—37 are pivotally mounted, as at 38 to the depending end flanges 39—39 of the cover section 20 for detachable engagement with the headed pins 40—40 which project outwardly from the flanges 33—33 of the end cover section 24 when the trunk is in unextended position for further securing the different elements of said trunk in the desired position. When the trunk is in extended position, the latch hooks 37—37 are adapted to engage with the headed pins 41—41 which project outwardly from the end walls 5—5 of the main stationary trunk section 3 for securing the cover section 20 in closed position thereon. The depending flange 27 of the rear cover section 24 is provided with the gripping handles 42.

The shiftable wall 8 of the movable section 7 of the trunk is further connected to the end walls 5—5 of the stationary main section 3 through the medium of a toggle device comprising a pair of arms 43—43 which have one end pivotally secured to the forwardly directed end flanges 19 of said shiftable wall 8, as clearly indicated at 44 in Figures 1, 2, and 3 of the drawings. It will be noted that the pivotal connection 44 is somewhat adjacent the upper edge of the shiftable wall 8. As best seen in Figure 3 of the drawings, the forward ends of the arms 43—43 are bifurcated and the furcations thereof are designated by the reference numeral 45 and extend between the furcations 46 of the toggle arms 47 to which the arm 43 is hingedly connected, as at 48′. The forward ends of the toggle arms 47—47 are pivotally connected to the outer sides of the end walls 5—5 of the stationary main section 3 of the lower rear corner portions thereof. A locking lever 48 is pivotally supported between the furcations of each of the toggle arms 43 and said levers 48 and arms 43 are provided with lock elements designated generally by the reference character 49 and which may be of any suitable type or construction for rigidly locking the free ends of the lever 48 in engagement with said arms 43. A yoke 50 straddles each of the levers 48 and is pivotally secured thereto as at 51, said yoke extending beyond the forward ends of the toggle arms 43 and having mounted in their free end portions a keeper 52 for engagement over a hook 53 fixed on an intermediate portion of each of the toggle arms 47 in a manner to secure the toggle arms 43 and 47 in extended longitudinally aligned position, as indicated in Figure 2 of the drawings. When the trunk is in unextended position, as seen in Figure 1 of the drawings, the keepers 50 are adapted for engagement with hooks 54 fixed on the outer sides of the end walls 5—5 of the stationary main section 3 for positively locking the trunk in an extended position. When it is desired to operate this locking mechanism, the lock 49 is released and the respective levers 48 are swung upwardly in a manner to engage the yokes 50 over the hooks 53 or 54 after which the levers 48 are again swung downwardly against the toggle arms 43 in manner to draw the yokes tightly into engagement with the hooks 53 or 54 and said levers are locked in this position and it will thus be impossible to shift the wall 8. In Figure 3 of the drawings the reference numeral 55 designates the pivotal connection between the adjacent end of the arms 47 and the stationary main section 5 of the trunk. As seen in Figure 1 of the drawings stop lugs 56 extend outwardly from the forward ends of the toggle arms 43 for engagement with the upper side of the toggle arms 47 to limit the swinging movement of said arms with respect to each other, as will be obvious.

Longitudinally disposed beams 57—57 are shiftably supported on the rear end portions of the bars 1—1 through the medium of the links 58 and 59 which have one end pivotally secured to said beams at points longitudinally spaced thereon and have their opposite ends pivotally connected in longitudinally spaced relation on the rear end portions of said bars 1—1. The links 58 and 59 maintain the beams 57 at all times in parallel relation with respect to the bars 1—1. Superposed transversely extending bumper bars 60 are mounted on the rear ends of the beams 57 through the medium of the brackets 61 and said bumper bars are provided with forwardly curved end portions 62 which are secured to the side of the beams 57 at an intermediate point on said beams through the medium of the yieldable braces 63.

As best illustrated in Figure 8 of the drawings, the beams 57 are adapted to rest on the upper edge of the vertical portion of the adjacent longitudinal bar 1 in either retracted position, as indicated in Figure 1 or in extended position, as illustrated in Figure 2. As seen in Figure 2, the rear ends of the beams 1—1 are provided with upstanding ears or lugs 64 for engagement with the sides of the beams 57 for maintaining the same in position on the upper edges of the bars 1.

Referring to Figures 8 and 9 of the drawings, it will be seen that upstanding brackets 65 are secured on the longitudinal bars 1—1 on the inner sides thereof and said brackets have their upper end portions provided with the elongated slots or openings 66. Brackets 67 are secured to the base portion of the brackets 65 and extend upwardly on the outer side of the longitudinal bars 1—1 and have pivotally mounted on their upper ends a lever 68 which, as seen in Figure 3 of the drawings, has a bifurcated inner end which straddles the adjacent bracket 67 and is pivotally connected thereto. Links 69 are pivotally connected to an intermediate portion of each of the levers 68 on opposite sides thereof and have mounted on their free ends a lock bolt 70 provided with a hooked free end portion which projects through the slot 66 of the adjacent bracket 65 for engagement with the upper wall of said slot. When the beams 57—57 are in retracted position, the levers 68 are raised in a manner to permit the hooked bolts 70 to be extended transversely over said beams and be projected through the slots 66 of the bracket 65 after which the levers 68 are swung downwardly in a manner to swing the outer end portion of the locking bolt 70 downwardly to rigidly secure said beams 57 in position against the upper edges of the longitudinal bars 1—1. The levers 68 are moved downwardly until they swing past the dead center of the pivotal connection of the links 69 thereon and the pivotal connection of said levers with the brackets 67. When the beams 57—57 are in extended position, the locking elements comprising the lock bolt 70, links 69 and levers 68 function in the same manner, said locking bolt 70 also engaging with the upper edges of the links 59, as seen in Figure 8. As will also be apparent from a study of Figure 8 of the drawings, the links 58 and 59 are disposed in pairs on each of the longitudinal bars 1, the links of each pair being disposed on opposite sides of the vertical portions of said bars.

Links or bars 71 are pivotally secured, at their opposite ends, to the extensible trunk section 7 and to the innermost of the links 58 in a manner to cause the movable trunk section, the beams 57, bumper 60 and the links 58 and 59 to be shifted in unison.

As illustrated in Figure 5 of the drawings, a pair of pivotally connected links 71 and 72 have their outer ends pivotally connected to the inner side of the cover section 20 and the end wall 5 for limiting the upward swinging movement of said cover section and for maintaining the same in raised position.

When the trunk is in closed or unextended position, as illustrated in Figure 1 of the drawings, and it is desired to extend the same to the position illustrated in Figure 2, the levers 68 adjacent the opposite ends thereof are swung upwardly in a manner to permit the latch or lock bolt 70 to be withdrawn from the bracket 65. The locks 49 on the toggle arms 43 are then released to permit the levers 48 to be swung upwardly to disengage the yokes 50 from the hooks 54 on the end walls 5 of the main stationary trunk section 3. The latch hooks 37 are then disengaged from the headed pins 40 to permit all of the cover sections to be swung upwardly and the shiftable rear wall 8 may then be moved to extended position causing the sectional end walls 9 and 10 to unfold to the position illustrated in Figure 4. As before stated, the bars 14 on the end wall sections 9—9 limit the outward swinging movement of the hingedly connected ends of said walls 9 and the sectional end walls 10. The bottom wall 15 is then swung forwardly and downwardly into a horizontal position on the hinge 17. The walls 16 may then be swung rearwardly and downwardly to a horizontal position in overlapping relation to the wall 15 or if desired, said wall 16 may be left in a vertical position and secured by suitable means in a manner to form a partition between the stationary trunk section 3 and the extensible trunk section 7. The cover sections 22 and 24 are then extended on their respective hinges 23 and 25 and the loop 29 is engaged over the uppermost hook 28 and the lever 30 is swung downwardly to secure the cover in closed position over the extended trunk. With the trunk in extended position, the levers 48—48 on the toggle arms 43—43 are again raised in a manner to permit the yokes 50 thereon to be engaged over the hook 53 on the toggle arms 47 and the levers are then swung downwardly into engagement with the upper edges of said toggle arms 43 and secured thereto through the medium of the locks 49 thereon and the trunk is thus securely locked in extended position. The rearward movement of the end wall 8 will cause the beams 57 to be moved upwardly and rearwardly and then downwardly with respect to the longitudinal arms 1 through the medium of the links 58 and 59 and the connecting links or arms 71. The latch bolt 70 is then inserted through the slot 66 of the bracket 65 and the levers 68 are again swung downwardly to locking position to securely clamp the beams 57 in extended position as illustrated in Figures 2 and 3 of the drawings.

It is believed that the many advantages of an automobile trunk constructed in accordance with this invention will be readily understood, and although the preferred embodiment of the invention is as illustrated and described, it is to be understood that changes in the details of construction may be had which will fall within the scope of the invention as claimed.

What is claimed is:—

1. An automobile trunk of the character described comprising a supporting frame, a fixed trunk section mounted thereon, an extensible trunk section mounted on the fixed trunk section and a bumper disposed rearwardly of the extensible trunk section and shiftably mounted on the supporting frame, and means operatively connecting the bumper to the extensible trunk section for actuation thereby for simultaneous shifting movement therewith on the supporting frame.

2. An automobile trunk of the character described comprising a supporting frame, a fixed trunk section mounted thereon, an extensible trunk section mounted on the fixed trunk section and a bumper disposed rearwardly of the extensible trunk section and shiftably mounted on the supporting frame, said bumper connected to the extensible trunk section in a manner to be shifted simultaneously with said section when the same is extended, means for locking the extensible section in extended or retracted position and a clamp mounted on the supporting frame adapted to secure the bumper in extended or retracted position.

3. An automobile trunk of the character described comprising a supporting frame, a fixed trunk section mounted thereon, an extensible trunk section mounted on the fixed trunk section and a bumper disposed rearwardly of the extensible trunk section and shiftably mounted on the supporting frame, said bumper connected to the extensible trunk section in a manner to be shifted simultaneously with said section when the same is extended, means for locking the extensible section in extended or retracted position and a clamp mounted on the supporting frame adapted to secure the bumper in extended or retracted position, and a sectional cover hingedly mounted on the fixed cross section and adapted to extend over the extensible section when the latter is in extended position.

4. An automobile trunk of the character described comprising a supporting frame, a fixed trunk section mounted thereon, an extensible trunk section mounted on the fixed trunk section and a bumper disposed rearwardly of the extensible trunk section and shiftably mounted on the supporting frame, said bumper connected to the extensible trunk section in a manner to be shifted simultaneously with said section when the same is extended, means for locking the extensible section in extended or retracted position and a clamp mounted on the supporting frame adapted to secure the bumper in extended or retracted position, and a sectional cover hingedly mounted on the fixed cross section and adapted to extend over the extensible section when the latter is in extended position, and co-acting means carried by the sectional cover and the extensible section for locking said cover in closed position when said extensible section is in either extended or unextended position.

5. An automobile trunk of the character described comprising a supporting frame, a fixed trunk section mounted thereon, an extensible trunk section mounted on the fixed trunk section, a pair of longitudinally extending beams shiftably mounted for longitudinal movement on the frame and extending rearwardly beyond the extensible trunk section, a bumper mounted on the rear ends of the beams and means operatively connecting the beams with the extensible trunk section in a manner to shift said beams and the bumper simultaneously with said section when the same is extended.

6. An automobile trunk of the character described comprising a supporting frame including a pair of parallel longitudinal bars for mounting on the automobile, a fixed trunk section mounted on the frame, an extensible trunk section mounted on the fixed trunk section, a pair of longitudinally extending beams, means for shiftably connecting the beams to the arms of the frame in a manner to permit said beams to be moved rearwardly with respect to the arms, said beams adapted to rest on said arms and said connecting means maintaining the beams in parallelism with the arms at all times, a bumper bar mounted on the rear ends of the beams, said beams being further operatively connected to the extensible trunk section in a manner to be shifted simultaneously therewith when the same is extended.

7. An automobile trunk of the character described comprising a supporting frame, said frame including a pair of spaced, parallel arms, a fixed trunk section mounted on the frame, an extensible trunk section mounted on the fixed trunk section, pairs of links pivotally connected at one end to the arms of the frame at longitudinally spaced points thereof, a longitudinally extending beam pivotally mounted on the opposite ends of the pairs of links on each arm, said beams adapted to be swung in an arcuate path rearwardly and longitudinally in parallelism with the arms of the frame and further adapted to rest on said arms, a bumper bar fixed on the rear ends of the beams, means for operatively connecting the beams to the extensible trunk section in a manner to shift said beams and the bumper bar simultaneously with said section when the same is extended.

8. An automobile trunk of the character described comprising a supporting frame, said frame including a pair of spaced, parallel arms, a fixed trunk section mounted on the frame, an extensible trunk section mounted on the fixed trunk section, pairs of links pivotally connected at one end to the arms of the frame at longitudinally spaced points thereon, a longitudinally extending beam pivotally mounted on the opposite ends of the pairs of links on each arm, said beams adapted to be swung in an arcuate path rearwardly and longitudinally in parallelism with the arms of the frame and further adapted to rest on said arms, a bumper bar fixed on the rear ends of the beams, means for operatively connecting the beams to the extensible trunk section in a manner to shift said beams and the bumper bar simultaneously with said section when the same is extended, means for locking the extensible trunk section in extended or unextended position and means mounted on the arms of the supporting frame engageable with the beams for clamping the latter in shifted or unshifted position.

9. An automobile trunk of the character described comprising a fixed trunk section, an extensible trunk section mounted on the fixed trunk section and comprising a shiftable vertical wall constituting the rear wall of the fixed section when in one position and constituting the rear wall of the extensible trunk section when in another position, pairs of vertically disposed hingedly connected co-acting end wall sections having their outer ends hingedly connected to the fixed trunk section and the shiftable wall and adapted for swinging movement in a horizontal plane, a bottom wall hingedly connected to the shiftable wall for swinging movement in a vertical plane thereon when said shiftable wall is in extended position, a sectional cover hingedly mounted on the fixed trunk section and adapted to extend over the extensible section and means for latching said cover in closed position.

10. An automobile trunk of the character described comprising a fixed trunk section, an extensible trunk section mounted on the fixed trunk section and comprising a shiftable vertical wall constituting the rear wall of the fixed section when in one position and constituting the rear wall of the extensible trunk section when in another position, pairs of vertically disposed hingedly connected co-acting end wall sections having their outer ends hingedly connected to the fixed trunk section in a horizontal plane, a bottom wall hingedly connected to the shiftable wall for swinging movement in a vertical plane thereon when said shiftable wall is in extended position, a sectional cover hingedly mounted on the fixed trunk section and adapted to extend over the extensible section and means for latching said cover in closed position, and a pair of toggle arms pivotally connected to the shiftable walls and to the fixed trunk section and having means thereon for locking the extensible trunk section in either extended or unextended position.

11. An automobile trunk of the character described comprising a fixed trunk section, an extensible trunk section mounted on the fixed trunk section and comprising a shiftable vertical wall constituting the rear wall of the fixed section when in one position and constituting the rear wall of the extensible trunk section when in another position, pairs of vertically disposed hingedly connected co-acting end wall sections having their outer ends hingedly connected to the fixed trunk section in a horizontal plane, a bottom wall hingedly connected to the shiftable wall for swinging movement in a vertical plane thereon when said shiftable wall is in extended position, a sectional cover hingedly mounted on the fixed trunk section and adapted to extend over the extensible section and means for latching said cover in closed position, and a pair of toggle arms pivotally connected to the shiftable walls and to the fixed trunk section and having means thereon for locking the extensible trunk section in either extended or unextended position, and a partition wall hingedly mounted in the fixed trunk section and adapted to be swung downwardly to a horizontal position in overlapping relation to the bottom wall of the extensible trunk section.

In testimony whereof I affix my signature.

JOHN C. HOFFMAN.